United States Patent
Pancholi et al.

(10) Patent No.: US 7,505,484 B2
(45) Date of Patent: Mar. 17, 2009

(54) REMOTE DISCOVERY AND STORAGE OF A PATH MAXIMUM TRANSMISSION UNIT (PMTU) VALUE

(75) Inventors: Ketan Priyakant Pancholi, Austin, TX (US); Dwip N. Banerjee, Austin, TX (US); Deanna Lynn Quigg Brown, Phoenix, AZ (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 10/926,584

(22) Filed: Aug. 26, 2004

(65) Prior Publication Data

US 2006/0045131 A1    Mar. 2, 2006

(51) Int. Cl.
*H04J 3/16* (2006.01)
(52) U.S. Cl. .................. 370/470; 370/473; 370/474
(58) Field of Classification Search ............. 370/468, 370/470, 472, 473, 474, 476, 477, 236, 252, 370/471; 709/230, 232, 236, 238, 243
See application file for complete search history.

(56) References Cited

U.S. PATENT DOCUMENTS

| 5,892,753 | A * | 4/1999 | Badt et al. ............... 370/233 |
| 6,985,496 | B2 * | 1/2006 | Miyamoto et al. ......... 370/471 |
| 7,103,674 | B2 * | 9/2006 | Brown et al. ............. 709/234 |
| 7,274,711 | B2 * | 9/2007 | Kajizaki et al. ........... 370/473 |
| 7,317,692 | B2 * | 1/2008 | Jason et al. .............. 370/252 |
| 2005/0281288 | A1 * | 12/2005 | Banerjee et al. ........... 370/477 |

* cited by examiner

*Primary Examiner*—Aung S Moe
*Assistant Examiner*—Kerri M Rose
(74) *Attorney, Agent, or Firm*—Casimer K. Salys; Dillon & Yudell LLP

(57) ABSTRACT

A method, system, and computer program product for optimizing a message size for communication in a communication network are disclosed. The method comprises identifying a connection to a target, sending to a path maximum transmission unit value server (which is not the target) a request for a path maximum transmission unit value for the connection to the target, and, in response to receiving the path maximum transmission unit value for the connection to the target from the server, optimizing a communication by sending to the target a packet having a size in accordance with the value.

27 Claims, 4 Drawing Sheets

REMOTE DISCOVERY AND STORAGE OF A PATH MAXIMUM TRANSMISSION UNIT (PMTU) VALUE

BACKGROUND OF THE INVENTION

1. Technical Field

The present invention relates in general to data processing and in particular to improving efficiency of data transmission and distribution within a data processing system network. Still more particularly, the present invention relates to a system, method and computer program product for storing on a server and delivering to a client a path maximum transmission unit value.

2. Description of the Related Art

The profusion of applications exchanging data across networks now enables a range of technologies inconceivable only a few years ago. Applications exchanging data over a network range from email clients and servers to World Wide Web browsers communicating with servers to Voice-over-Internet-Protocol (VoIP) applications.

Computers transmit data over the Internet in units called packets. Packets are transmitted across the Internet between a sending data processing system and a target data processing system through one or more relay data processing systems along a path or connection between the sending data processing system and the target data processing system. Optimal packet size for processing varies by application, as does the maximum packet size that various data processing systems can accommodate.

A recurring and frustrating problem is encountered when a packet, which was sent by a sending data processing system, is too large to be transmitted by a relaying data processing system, which receives it along the chosen path between the sending data processing system and the target data processing system. Packets that are too large to be retransmitted by a system along the path are frequently rejected as they are received.

Two conventional methods exist for handling the problems associated with the rejection of oversized packets. A sending computer can conventionally either permit packet fragmentation, a less preferred method used mostly by legacy systems, or provide for Path Maximum Transmission Unit (PMTU) discovery by asking for Internet Control Message Protocol (ICMP) notification when fragmentation would otherwise be needed to prevent rejection of an oversized packet.

By default, modern servers disable fragmentation and try to use PMTU discovery. Every network link has a maximum packet size called the link's Maximum Transmission Unit (MTU). The full path from one computer to another may travel across many links with different MTUs. The minimum of the MTUs for all of the links in a path is the PMTU. Even if a packet starts out on a network segment with a large MTU, it may later arrive at a link with a smaller MTU, and the link with the smaller MTU may reject the packet as being too large for retransmission. While most servers provide path segments with large MTUs, many users connect via links with reduced MTUs.

Solutions to the problem of oversized packets have evolved considerably over time. The original approach was to send only small packets corresponding to the TCP/IP default MTU (576 bytes). To this day, a sending system needs permission from the receiving system to send larger packets, but that permission is given as a matter of routine.

For some packets, especially those sent by older equipment, an oversized packet can be sent by breaking it into fragments and sending the fragments as smaller packets. The fragments can be reassembled downstream to reconstruct the original large packet, but this packet fragmentation creates problems involving both efficiency and security. Newer servers try to optimize their transmissions by discovering the PMTU and sending packets of the maximum acceptable size when there is enough data to fill them, the procedure for which was standardized and published as Internet Engineering Task Force Request For Comments (RFC) 1191 in 1990. By 2002, 80% to 90% of computers on the Internet used path MTU discovery.

The basic procedure of PMTU discovery involves sending the largest available packet that can be sent by the local system and waiting for a notification that the packet was too large. The notification that a packet was too large will contain information on the largest sendable packet size and will arrive as ICMP packets known as "fragmentation needed" ICMPs (ICMP type 3, subtype 4). The notifications are requested by setting the "do not fragment" (DF) bit in packets that are sent out. Unfortunately, the simple solution described above creates significant inefficiency when multiple systems on a network send large packets and receive error messages.

The first inefficiency created by the solution described above relates to the increased time necessary to transmit the individual packet, which is rejected as being too large and subsequently retransmitted. The oversized packet is delayed by being rejected, divided and resent as multiple packets.

The second inefficiency relates to the increase in the number of packets transmitted. Simply put, transmitting the initial oversized packet, transmitting the error notification message, and transmitting a correctly-sized packet, clogs the network with three rackets, where only one would have been required if sized correctly. The increase in the number of packets creates latency and delay with respect to all traffic on the network.

Both of these inefficiencies become yet more problematic as they are duplicated for several machines on a subnet.

Some applications (e.g. electronic mail and file transfer protocol clients) are able to tolerate high levels of latency and delay in data receipt. These clients were not designed with the perception of 'real time' interaction with the network, and users will tolerate a substantial aggregate delay between the time at which information is sent and the time at which it is received. Users are, however, generally less tolerant of the loss of information between the sending and receiving points, which sometimes occurs as a result of the need to resend packets, which is discussed above.

Increasingly, applications such as Voice over Internet Protocol or streaming video require the lowest possible delivery latency for information. What is needed is a way to optimize a message to correspond to the PMTU value for a connection to a target without incurring the latency associated with conventional PMTU discovery techniques.

SUMMARY OF THE INVENTION

A method, system, and computer program product for optimizing a message size for communication in a communication network are disclosed. The method comprises identifying a connection to a target, sending to a path maximum transmission unit value server (which is not the target) a request for a path maximum transmission unit value for the connection to the target, and, in response to receiving the path maximum transmission unit value for the connection to the target from the server, optimizing a communication by sending to the target a packet having a size in accordance with the value.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE ILLUSTRATIVE EMBODIMENT

Figure 1:
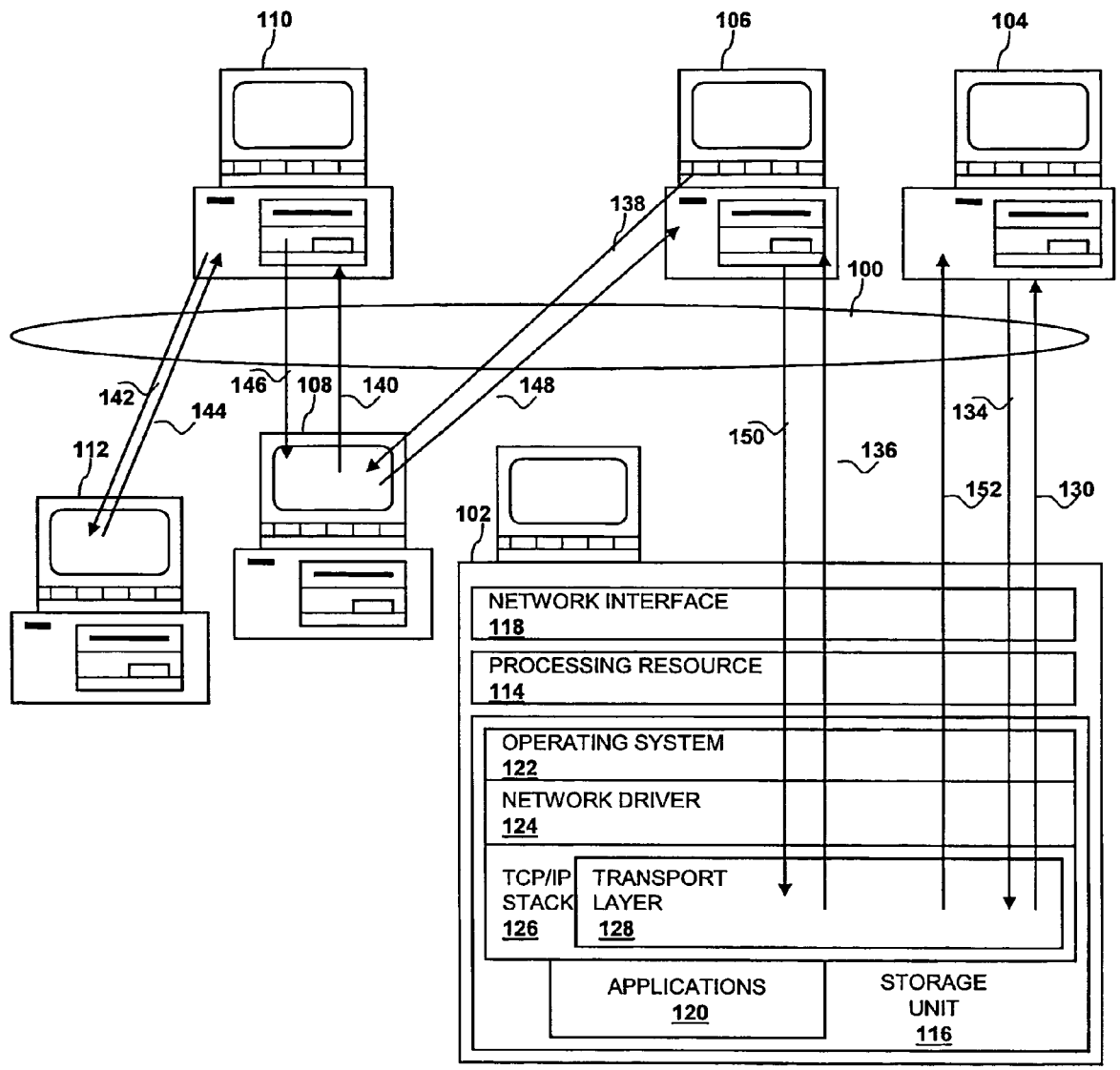
FIG. 1 illustrates an exemplary data processing system network environment, in which preferred embodiments of the method, system and computer program product for remote storage and discovery of a path maximum transmission unit value on a network are implemented.

With reference now to the figures and in particular with reference to FIG. 1, there is depicted an exemplary network environment with which the present invention may be advantageously utilized. The illustrated network environment includes a local or wide area network 100, such as the Internet or another packetized digital network. A local data processing system 102 and a path maximum transmission unit value server 104 are attached to network 100. PMTU value server 104 can be implemented, for example, as a dedicated machine or a background process running on a data processing system that is primarily used for another application (e.g., operating in the background on a data processing system that primarily serves as an FTP server, an HTTP server, a simple mail transfer protocol (SMTP) and Post Office Protocol 3 (POP3) or Internet Message Access Protocol (IMAP) server, a client machine, or a file server). Additionally a first relay data processing system 106, a second relay data processing system 108, a third relay data processing system 110 and a target data processing system 112 are connected to network 100.

Path maximum transmission unit value server 104 performs functions related to the storing, sending, and receiving of values for the PMTU for a connection, also called path, between two nodes on a network, such as local data processing system 102 and target data processing system 112, by means of the path including first relay data processing system 106, second relay data processing system 108, and third relay data processing system 110. Functions of path maximum transmission unit value server 104 include receiving queries for PMTU values for a given path, answering those queries, receiving updates for the PMTU value along a given path, and storing and processing those updates. Path maximum transmission unit value server 104 and local data processing system 102 may both be implemented with conventional or later-developed hardware or software.

Local data processing system 102 includes a processing resource 114 for performing data processing functions and a storage unit 116 for storing items of data or instructions for use by processing resource 114. Local data processing system 102 also includes a network interface 118 for communicating with other devices attached to network 100.

Turning in detail to storage unit 116, storage unit 116 may be implemented as a Random Access Memory (RAM) or as another form of storage, such as a direct access storage device. As illustrated, storage unit 116 stores applications 120, (any of which can be kernel applications or user space applications), operating system (OS) 122, network driver 124, and Transmission Control Protocol/Internet Protocol (TCP/IP) stack 126, which includes transport layer 128. In the preferred embodiment depicted in FIG. 1, messages sent across network 100 originate in transport layer 128, though one skilled in the art will quickly ascertain that some applications may advantageously create messages to be sent across network 100 that originate at other protocol layers in different architectures.

The present invention improves efficiency of data transmission between two points in a data processing system network, such as local data processing system 102 and target data processing system 112, by optimizing, in accordance with a path maximum transmission unit value received from path maximum transmission unit value server 104, the size of a packet, transmitted from local data processing system 102 to target data processing system 112 across network 100. For purposes of illustration, the path of the packet includes first relay data processing system 106, second relay data processing system 108, and third relay data processing system 110. Optimization is accomplished through the use of several messages, which are sent and received by local data processing system 102 or path maximum transmission unit value server 104 and detailed with respect to FIG. 1 and the subsequent flowchart diagrams.

Figure 2:
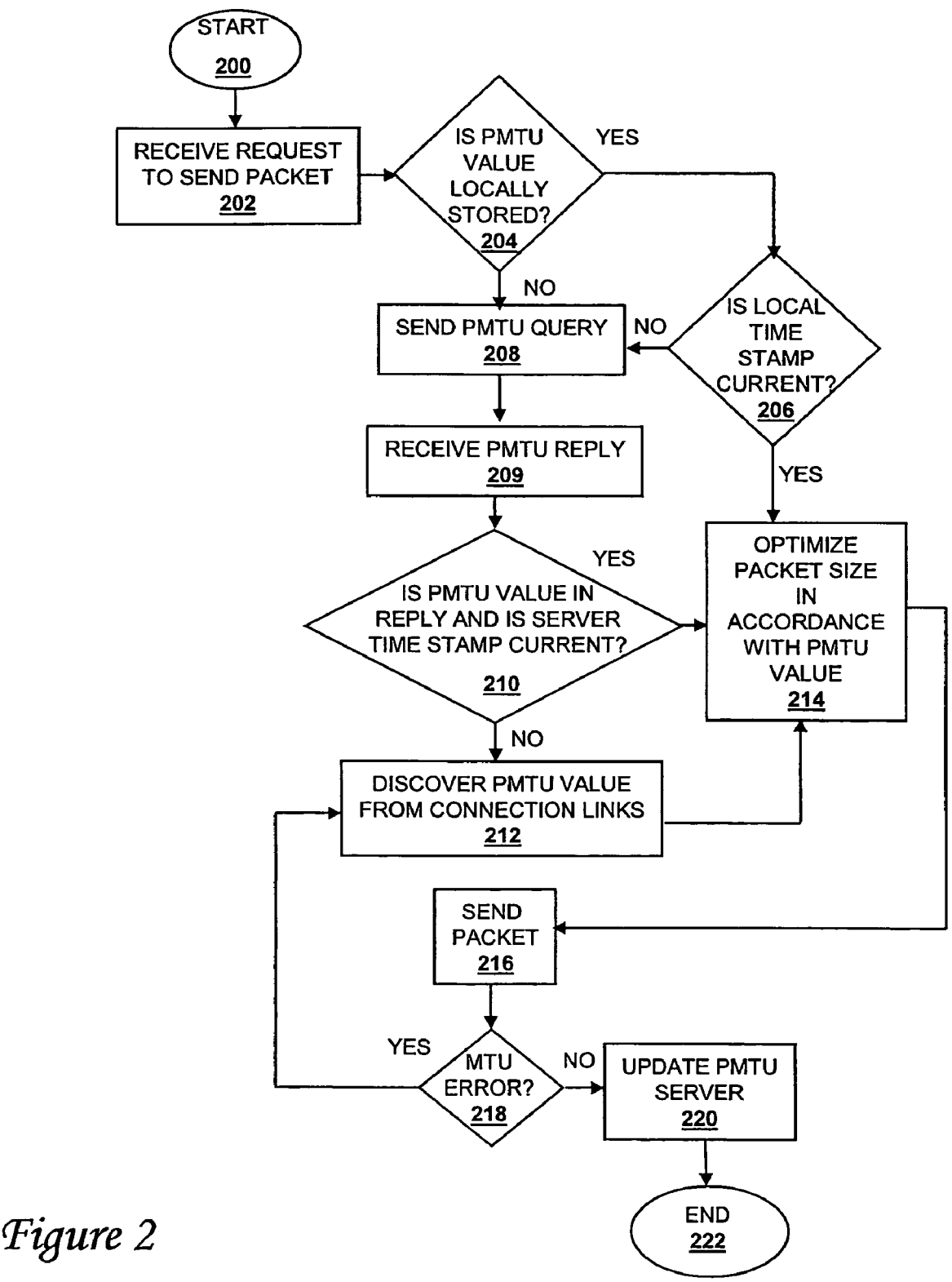
FIG. 2 is a high-level logical flowchart of a process by which a client may operate in a system for remote storage and discovery of a path maximum transmission unit value on a network in accordance with a preferred embodiment of the present invention.

With reference now to FIG. 2, there is depicted a high-level logical flowchart of a process by which a client may operate in a system for remote storage and discovery of a path maximum transmission unit value on a network in accordance with a preferred embodiment of the present invention. The process begins at step 200, which corresponds to a request from an application 120 for a message to be sent to target data processing system 112. The process then proceeds to step 202, which illustrates transport layer 128 receiving the request.

The process of FIG. 2 next moves to step 204, which depicts TCP/IP stack 126 determining whether a PMTU value is locally stored in storage unit 116 of local data processing system 102. Determining whether a PMTU value is locally stored will involve identifying a connection to target data processing system 104 and then determining whether a PMTU value for the identified connection exists. In the preferred embodiment illustrated in FIG. 2, whenever local data processing system 102 receives or discovers a PMTU value for an identified connection, that information will be stored locally in storage unit 116, to await re-use. If a stored PMTU value for the identified connection is available locally in storage unit 116 on local data processing system 102, the process then proceeds to step 206, which illustrates TCP/IP stack 126 determining whether the time stamp of the locally stored PMTU value is sufficiently recent to allow for use of the PMTU. The required recency of time stamp will be selectably configurable and capable of being dynamically determined. With some very stable paths, TCP/IP stack 126 may be configured such that the time stamp will not need to be particularly recent. A stable path may occur, for example, when an entire path is within a single corporate network. In other cases, in which network conditions change rapidly, such as transmission over the public Internet to a distant target, TCP/IP stack 126 may require a more recent time stamp.

If, in step 204, no locally stored PMTU value is available, or if the time stamp of an available PMTU value does not meet the recency requirements of step 206, the process next moves to step 208, which depicts transport layer 128 within TCP/IP stack 126 sending a PMTU query 130 over network 100 to path maximum-transmission unit server 104. In order to transmit PMTU query 130, transport layer 128 sends PMTU query 130 down through TCP/IP stack 126 to network driver 124. Network driver 124 then passes PMTU query 130 to operating system 122, which, through the operation of processing resource 114, sends PMTU query 130 to path maximum transmission unit value server 104 over network 100 via network interface 118.

When path maximum transmission unit value server 104 responds to PMTU query 130 by sending PMTU reply 134, which contains a path maximum transmission unit value for the desired connection to target data processing system 112, to local data processing system 102 across network 100, the process then proceeds to step 209, which illustrates TCP/IP stack receiving PMTU reply 134. In receiving PMTU reply 134, processing resource 114 routes PMTU reply 134 from network interface 118 to operating system 122 in storage unit 116. Once PMTU reply 134 has arrived within storage unit 116, operating system 122 sends PMTU reply 134 from network driver 124 to transport layer 128 within TCP/IP stack 126.

After local data processing system 102 receives PMTU reply 134, the process then proceeds to step 210, which illustrates TCP/IP stack 126 determining whether a PMTU value was contained in the PMTU reply received in step 208 and whether the time stamp of the PMTU value received in step 208 is sufficiently recent to allow for use of the PMTU value. As in step 206, the required recency of time stamp will be selectably configurable and capable of being dynamically determined.

If, in step 210, the time stamp for the PMTU value received in PMTU reply 134 is determined to be insufficiently recent, the process next moves to step 212, which depicts local data processing system 102 discovering the PMTU value for the connection to target data processing system 112 by transmitting messages along the connection path, as discussed above. One skilled in the art will realize that transport layer protocol messages can be used to discover PMTU value for the connection to target data processing system 112, as can user datagram protocol message or test packets.

If, in either of step 206 or step 210, transport layer 128 determines that local data processing system 102 possesses a PMTU value with a sufficiently recent time stamp, or after the completion of PMTU discovery in step 212, the process next proceeds to step 214, which depicts transport layer 128 optimizing the size of packet 136 to be sent to target data processing system 112 across network 100 by means of first relay data processing system 106, second relay data processing system 108, and third relay data processing system 110. Optimizing the size of a packet consists preparing a packet having a size equal to or less than the PMTU valued stored on local data processing system 102, received from PMTU value server 104 or discovered from the selected path.

The process then moves to step 216, which depicts transport layer 128 within TCP/IP stack 126 sending a packet 136 over network 100 to target data processing system 112. In order to transmit packet 136, transport layer 128 sends packet 136 down through TCP/IP stack 126 to network driver 124. Network driver 124 then passes packet 136 to operating system 122, which, through the operation of processing resource 114, sends packet 136 to first relay data processing system 106 over network 100 via network interface 118. First relay data processing system 106 then sends packet 138 to second relay data processing system 108 over network 100, and second relay data processing system 108, in turn, sends packet 140 to third relay data processing system 110 over network 100. Third relay data processing system 110 then sends packet 142 to target data processing system 112 over network 100, and target data processing system 112 responds to packet 142 by sending confirmation 144 to third relay data processing system 110 over network 100.

Third relay data processing system 110 then sends confirmation 146 to second relay data processing system 108 over network 100. Second relay data processing system 108 then sends confirmation 148 to first relay data processing system 106 over network 100. First relay data processing system 106 finally sends confirmation 150 to local data processing system 102 over network 100. In response to receiving confirmation 150, processing resource 114 routes confirmation 150 from network interface 118 to operating system 122 in storage unit 116. Once confirmation 150 has arrived within storage unit 116, operating system 122 sends confirmation 150 from network driver 124 to transport layer 128 within TCP/IP stack 126. The operation of the preferred embodiment described above assumes that no errors in transmission occur.

Once local data processing system 102 has sent packet 136 across network 100, the process then proceeds to step 218, which depicts local data processing system 102 determining whether an MTU error has occurred. If an MTU error has occurred, then the process moves to step 212, which depicts local data processing system 102 discovering a PMTU value from connection links, as described above. If no MTU error has occurred, then the process next proceeds to step 226, which illustrates local data processing system 102 updating the PMTU value that is stored on Path Maximum Transmission Unit value server 104 by sending PMTU update 152 over network 100.

Details concerning the transmission by local data processing system 102 of PMTU update 152 over network 100 to Path Maximum Transmission Unit value server 104 may vary depending upon the needs addressed by a particular embodiment. In some embodiments, particularly those based on TCP, local data processing system 102 will send PMTU update 152 over network 100 to Path Maximum Transmission Unit value server 104 after the earlier of the time at which a connection closes and a selectably-configurable interval. In UDP implementations, local data processing system 102 will send PMTU update 152 over network 100 to Path Maximum Transmission Unit value server 104 at the end of a selectably-configurable amount of time. If local data processing system 102 is sending PMTU update 152 over network 100 to Path Maximum Transmission Unit value server 104 in response to having discovered the PMTU value from connection links, PMTU update 152 can contain either an PMTU value received in an ICMP error message (Fragmentation needed, as described above) or a value drawn from a table of well-known PMTU values, which can be stored by operating system 122.

In order to transmit PMTU update 152, transport layer 128 sends PMTU update 152 down through TCP/IP stack 126 to network driver 124. Network driver 124 then passes PMTU update 152 to operating system 122, which, through the operation of processing resource 114, sends PMTU update 152 to path maximum transmission unit value server 104 over network 100 via network interface 118. The process thereafter ends at step 222.

Figure 3:
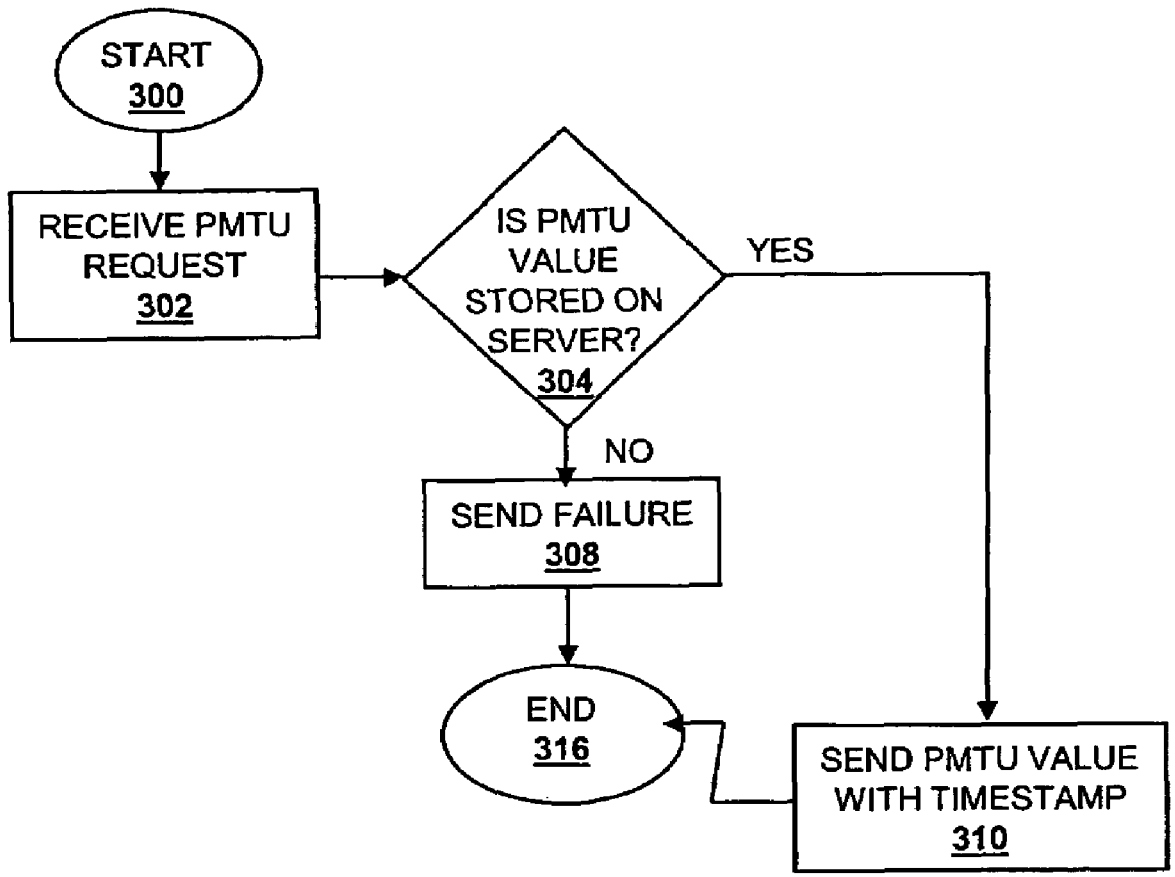
FIG. 3 is a high-level logical flowchart of a process by which a server may respond to PMTU queries in a system for remote storage and discovery of a path maximum transmission unit value on a network in accordance with a preferred embodiment of the present invention.

With reference now to FIG. 3, there is depicted a high-level logical flowchart of a process by which a server may operate in a system for remote storage and discovery of a path maximum transmission unit value on a network in accordance with a preferred embodiment of the present invention. The process begins at step 300, which corresponds to activation of PMTU value server 104. The process then proceeds to step 302, which illustrates PMTU value server 104 receiving a PMTU query 300 from local data processing system 102.

The process next moves to step 304, which depicts path maximum transmission unit value server 104 determining whether a PMTU value is stored on path maximum transmission unit value server 104. In the preferred embodiment illustrated in FIG. 3, whenever path maximum transmission unit value server 104 receives or discovers a PMTU value for a given connection, that information will be stored on path maximum transmission unit value server 104, to await use in response to a query. If, in step 304, no stored PMTU value is available, the process next moves to step 308, which depicts path maximum transmission unit value server 104 sending a PMTU failure message (not depicted in FIG. 1) over network 100 to local data processing system 102. Optionally, some embodiments will, rather than send a failure message, allow PMTU value server 104 to discover the PMTU value for a path if none is stored, and then send the discovered PMTU value. Such an embodiment may allow local data processing system 102, if incapable of independently discovering a PMTU value, to set a flag in PMTU query 130, requiring path maximum transmission unit value server 104 to discover the PMTU value for a connection. After completing step 308, the process then proceeds to step 316, in which the process ends.

If a stored PMTU value is available on path maximum transmission unit value server 104, the process then proceeds to step 310, which illustrates path maximum transmission unit value server 104 responding to PMTU query 130 by sending PMTU reply 134, which contains a path maximum transmission unit value for the desired connection to target data processing system 112, to local data processing system 102 across network 100. After completing step 310, the process then proceeds to step 316, in which the process ends.

Figure 4:
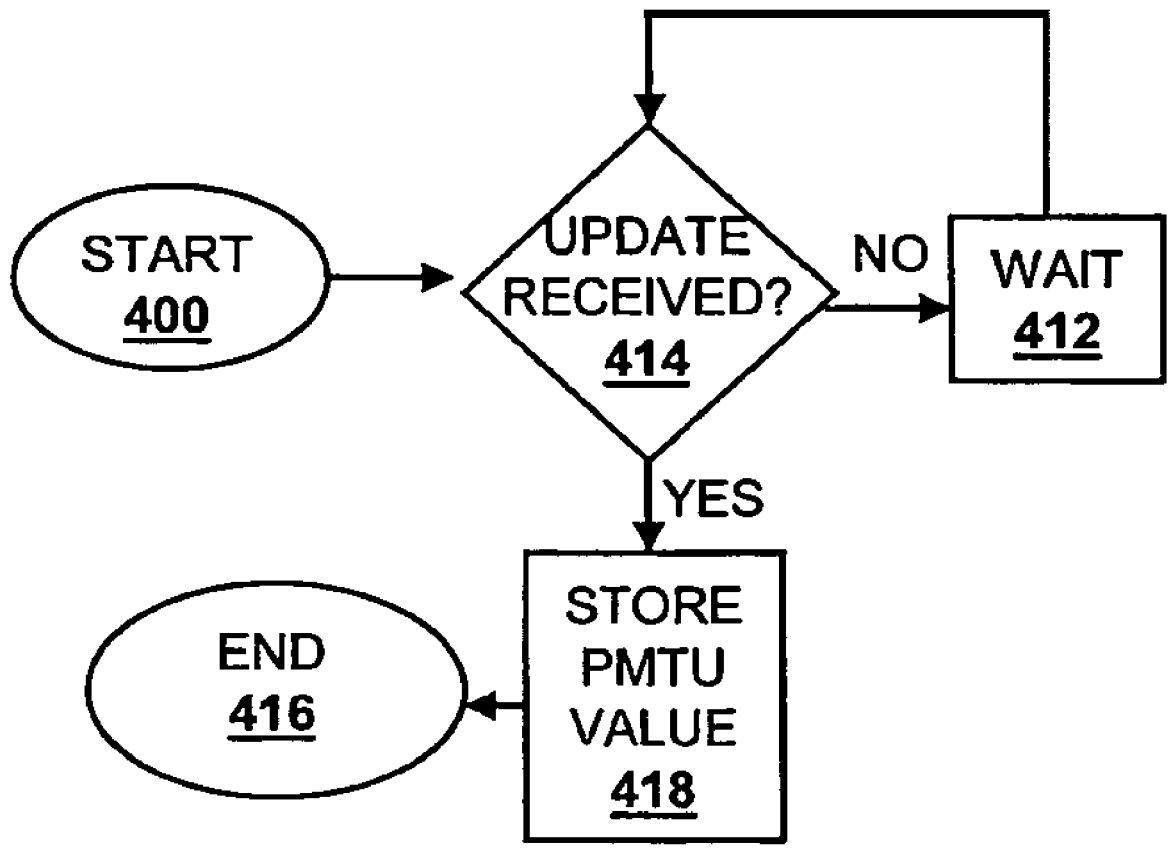
FIG. 4 is a high-level logical flowchart of a process by which a server may receive and store updates of a PMTU value in a system for remote storage and discovery of a path maximum transmission unit value on a network in accordance with a preferred embodiment of the present invention.

With reference now to FIG. 4, there is depicted a high-level logical flowchart of a process by which a server may receive and store updates of a PMTU value in a system for remote storage and discovery of a path maximum transmission unit value on a network in accordance with a preferred embodiment of the present invention. The process begins at step 400, which corresponds to activation of PMTU value server 104. The process next moves to step 414, which illustrates PMTU value server 104 determining whether an update to the PMTU value has been received.

If, in step 414, no PMTU update to the PMTU value has been received, then the process proceeds to step 412, which depicts PMTU value server 104 waiting. If, in step 414, an update to the PMTU value, has been received, the process next moves to step 418, where the PMTU update 152 is stored on path maximum transmission unit value server 104. The process then ends at step 416.

The method, system and computer program product for remote storage and discovery of a path maximum transmission unit value on a network improve efficiency by reducing the need for individual data processing systems to discover PMTU values. Receipt of a PMTU value from a server, rather than from individual discovery, reduces the processing resources needed to discover a PMTU value. As one skilled in the art will quickly realize, once a PMTU value is known for a system on a given subnet, that value is also available for all transmissions employing the same path. Once the PMTU value is known, the process of receiving a PMTU value from a server, rather than by individual discovery, reduces the latency of messages sent by all other data processing systems that also receive the PMTU value from the server. Additionally, the option for the server to discover the PMTU value, rather than having it discovered by the sending data processing system, if employed, creates the opportunity for sending data processing systems to take advantage of the PMTU even though the sending data processing system is not equipped to individually discover the PMTU value.

Once the PMTU value is known, the process of receiving a PMTU value from a server, rather than by individual discovery, reduces the total message traffic on the network. The present invention adds tremendous value in reducing network congestion and transmission latency, and overall system performance is improved.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type or storage media, such as floppy disks or CD ROMs, and transmission type media, such as analog or digital communications links.

What is claimed is:

1. A method of optimizing a message size for communication between a sender and a target in a communication network, said method comprising:

identifying a first connection in the communication network from a sender to a target;

the sender sending a request via a second connection in the communication network to a path maximum transmission unit value server, which is not said target and is not in said first connection to said target, wherein the request requests a path maximum transmission unit value for said first connection from the sender to said target; and in response to receiving said path maximum transmission unit value for said first connection to said target in a message received from said server, said sender optimizing a communication by sending a packet having a size in accordance with said value to said target via said first connection.

2. The method of claim 1, wherein optimizing a communication further comprises sending to said target a packet having said size in accordance with said value only if a time stamp in said message indicates said path maximum transmission unit was determined within a selectably fixed amount of time.

3. The method of claim 1, wherein said sending to said target a packet with said size in accordance with said value further comprises sending to said target a packet with said size equal to said value.

4. The method of claim 1, wherein said sending to said target a packet with said size in accordance with said value further comprises sending to said target a packet with said size less than said value.

5. The method of claim 1, further comprising:

in response to failing to receive said path maximum transmission value unit from said server, discovering said path maximum transmission value for said first connection from communication with a link in said first connection; and in response to discovering said path maximum transmission unit value, the sender sending said maximum transmission value for said first connection to said server via the communication network.

6. The method of claim 5, wherein discovering said path maximum transmission unit value for said first connection further comprises employing one or more Internet control message protocol messages.

7. The method of claim 5, wherein discovering said path maximum transmission unit value for said first connection further comprises employing one or more user datagram protocol messages.

8. The method of claim 5, wherein discovering said path maximum transmission unit value for said first connection further comprises employing one or more transport layer protocol messages.

9. The method of claim 5, wherein discovering said path maximum transmission unit value for said first connection further comprises sending a test packet to said target.

10. A system for optimizing a message size for communication in a communication network, said system comprising:

means for identifying a first connection in the communication network from the system to a target;

means for sending a request via a second connection in the communication network to a path maximum transmission unit value server, which is not said target and is not in said first connection to said target, wherein the request requests a path maximum transmission unit value for said first connection from the system to said target; and means, responsive to receiving said path maximum transmission unit value for said first connection to said target in a message received from said server, for optimizing a communication by sending a packet having a size in accordance with said value to said target via said first connection.

11. The system of claim 10, wherein said means for optimizing a communication further comprises means for sending to said target a packet having said size in accordance with said value only if a time stamp in said message indicates said path maximum transmission unit was determined within a selectably fixed amount of time.

12. The system of claim 10, wherein said means for sending to said target a packet with a size in accordance with said value further comprises means for sending to said target a packet with said size equal to said value.

13. The system of claim 10, wherein said means for sending to said target a packet with a size in accordance with said value further comprises means for sending to said target a packet with said size less than said value.

14. The system of claim 10, further comprising:

means, in response to failing to receive said path maximum transmission value unit from said server, for discovering said path maximum transmission value for said first connection from communication with a link in said first connection; and means, in response to discovering said path maximum transmission unit value, for sending said maximum transmission value for said first connection to said server via the communication network.

15. The system of claim 14, wherein said means for discovering said path maximum transmission unit value for said first connection further comprises means for employing one or more Internet control message protocol messages.

16. The system of claim 14, wherein said means for discovering said path maximum transmission unit value for said first connection further comprises means for employing one or more user datagram protocol messages.

17. The system of claim 14, wherein discovering said path maximum transmission unit value for said first connection further comprises means for employing one or more transport layer protocol messages.

18. The system of claim 14, wherein said means for discovering said path maximum transmission unit value for said first connection further comprises means for sending a test packet to said target.

19. A computer program product for optimizing a message size for communication in a communication network, said computer program product comprising:

a tangible computer-readable storage medium;

instructions on said computer-readable storage medium for identifying a first connection in the communication network from a sender to a target;

instructions on said computer-readable storage medium for sending a request via a second connection in the communication network to a path maximum transmission unit value server, which is not said target and is not in said first connection to said target, wherein the request requests a path maximum transmission unit value for said first connection from the sender to said target; and instructions on said computer-readable storage medium for, in response to receiving said path maximum transmission unit value for said first connection to said target in a message received from said server, optimizing a communication by sending a packet having a size in accordance with said value from the sender to said target via said first connection.

20. The computer program product of claim 19, wherein said instructions for optimizing a communication further comprise instructions on the computer-readable storage medium for sending to said target a packet having said size in accordance with said value only if a time stamp in said message indicates said path maximum transmission unit was determined within a selectably fixed amount of time.

21. The computer program product of claim 19, wherein said instructions for sending to said target a packet with a size in accordance with said value further comprise instructions on the computer-readable storage medium for sending to said target a packet with said size equal to said value.

22. The computer program product of claim 19, wherein said instructions for sending to said target a packet with a size in accordance with said value further comprise instructions on the computer-readable storage medium sending to said target a packet with said size less than said value.

23. The computer program product of claim 19, further comprising:

instructions on the computer-readable storage medium for, in response to failing to receive said path maximum transmission value unit from said server, discovering said path maximum transmission value for said first connection from communication with a link in said connection; and instructions on the computer-readable storage medium for, in response to discovering said path maximum transmission unit value, sending said maximum transmission value for said first connection from the sender to said server via the communication network.

24. The computer program product of claim 23, wherein said instructions for discovering said path maximum transmission unit value for said first connection further comprise instructions on the computer-readable storage medium for employing one or more Internet control message protocol messages.

25. The computer program product of claim 23, wherein said instructions for discovering said path maximum transmission unit value for said first connection further comprise instructions on the computer-readable storage medium for employing one or more user datagram protocol messages.

26. The computer program product of claim 23, wherein said instructions for discovering said path maximum transmission unit value for said first connection further comprise instructions on the computer-readable storage medium for employing one or more transport layer protocol messages.

27. The computer program product of claim 23, wherein said instructions for discovering said path maximum transmission unit value for said first connection further comprise instructions on the computer-readable storage medium for sending a test packet to said target.

* * * * *